US011651587B2

(12) United States Patent
Loh et al.

(10) Patent No.: US 11,651,587 B2
(45) Date of Patent: May 16, 2023

(54) METHOD AND APPARATUS FOR PRODUCT QUALITY INSPECTION

(71) Applicant: Siemens Aktiengesellschaft, Munich (DE)

(72) Inventors: Chang Wei Loh, Suzhou (CN); Jing Wen Zhu, Xian (CN); Wei Yu Chen, Suzhou (CN); Yue Yu, Chuzhou (CN); Cong Chao Li, Suzhou (CN); Li Qun Ding, Suzhou (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/788,935

(22) PCT Filed: Dec. 27, 2019

(86) PCT No.: PCT/CN2019/129439
§ 371 (c)(1),
(2) Date: Jun. 24, 2022

(87) PCT Pub. No.: WO2021/128343
PCT Pub. Date: Jul. 1, 2021

(65) Prior Publication Data
US 2023/0058944 A1 Feb. 23, 2023

(51) Int. Cl.
*G06K 9/00* (2022.01)
*G06T 7/00* (2017.01)
(52) U.S. Cl.
CPC .... *G06T 7/001* (2013.01); *G06T 2207/20081* (2013.01); *G06T 2207/20084* (2013.01); *G06T 2207/30108* (2013.01)
(58) Field of Classification Search
CPC ........... G06T 7/001; G06T 2207/20081; G06T 2207/20084; G06T 2207/30108
See application file for complete search history.

(56) References Cited

U.S. PATENT DOCUMENTS 6,140,833 A * 10/2000 Flietner ................. B24B 37/013
257/E21.528
8,423,490 B2 * 4/2013 Deco .................... G06K 9/6296
706/25
(Continued)

FOREIGN PATENT DOCUMENTS

CN 105478976 4/1996 ............. B23K 10/02
CN 105088595 11/2015 ............. D06B 23/20
(Continued)

OTHER PUBLICATIONS

Search Report for International Application No. PCT/CN2019/129439, 14 pages, dated Sep. 25, 2020.

*Primary Examiner* — Samir A Ahmed
(74) *Attorney, Agent, or Firm* — Slayden Grubert Beard PLLC

(57) ABSTRACT

Various embodiments include a method for product quality inspection on a group of products. The method may include: getting for each product in the group of products: image, value for each known fabrication parameter affecting quality of the group of products, and quality evaluation result; training a neural network. A layer of the neural network comprises at least one first neuron and at least one second neuron; each first neuron represents a known fabrication parameter affecting quality of the group of products and each second neuron represents an unknown fabrication parameter affecting quality of the group of products; and the images of the group of products are input to the neural network, the quality evaluation results are output of the neural network, and the value of each first neuron is set to the value for the known fabrication parameter the first neuron representing.

9 Claims, 5 Drawing Sheets

(56) References Cited

U.S. PATENT DOCUMENTS

| | | | | |
|---|---|---|---|---|
| 2012/0088316 | A1* | 4/2012 | Lu | H01L 21/67265 |
| | | | | 438/5 |
| 2016/0274036 | A1* | 9/2016 | Plihal | G03F 7/7065 |
| 2017/0201243 | A1* | 7/2017 | Hu | G11C 7/1057 |
| 2019/0362221 | A1 | 11/2019 | Ando | G06N 3/04 |

FOREIGN PATENT DOCUMENTS

| | | | |
|---|---|---|---|
| CN | 106872509 | 6/2017 | G01N 25/00 |
| CN | 107855687 | 3/2018 | B23K 37/00 |
| CN | 109711714 | 5/2019 | G06Q 10/06 |
| CN | 109964234 | 7/2019 | G06K 9/03 |
| RO | 128159 | 5/2015 | G01N 23/04 |
| WO | 2018163786 | 9/2018 | G06K 9/46 |

\* cited by examiner

METHOD AND APPARATUS FOR PRODUCT QUALITY INSPECTION

CROSS-REFERENCE TO RELATED APPLICATIONS

This application is a U.S. National Stage Application of International Application No. PCT/CN2019/129439 filed Dec. 27, 2019, which designates the United States of America, the contents of which are hereby incorporated by reference in their entirety.

TECHNICAL FIELD

The present disclosure relates product quality inspection. Various embodiments of the teachings herein include methods, apparatuses, and/or computer-readable storage media for product quality inspection.

BACKGROUND

Product production processes, such as industrial processes usually use some form of quality inspection to ensure product quality. Automated vision inspection systems are frequently used to achieve such purposes, whereby such inspection systems use a variety of computer algorithms to examine captured images of a product for any defect. Once defects are found, products with defects are separated from high quality ones. However, above inspection systems only help manufacturers to identify defective products, they do not help to gain any insight on ways to improve product quality.

SUMMARY

The teachings of the present disclosure may be used to implement methods, systems, and/or computer programs for product quality inspection on a group of products. For example, some embodiments of the teachings herein may include a method comprising: getting (S201), of each product in the group of products: an image, a value for each known fabrication parameter affecting quality of the group of products, and quality evaluation result; training (S202) a neural network, wherein the layer M of the neural network comprises at least one first neuron and at least one second neuron, and each first neuron represents a known fabrication parameter affecting quality of the group of products and each second neuron represents an unknown fabrication parameter affecting quality of the group of products, and the images of the group of products are input to the neural network, the quality evaluation results are output of the neural network, and the value of each first neuron is set to the value for the known fabrication parameter the first neuron representing.

In some embodiments, the method further includes: calculating (S203) respectively for each second neuron, based on the trained neural network, influence on quality change due to change of value for the second neuron; and comparing (S204) the calculated influences, to determine the number of unknown fabrication parameters affecting quality of the group of products.

In some embodiments, training (S202) a neural network comprises: repeating following steps until predefined condition meets: adding (S2021) a second neuron to the layer M of the neural network; training (S2022) the neural network, wherein value of each neuron in the layer M except the new added second neuron is set to the value for the fabrication parameter the neuron representing; and calculating (S2023), based on the trained neural network, value for the new added second neuron, as the value of the unknown fabrication parameter the new added second neuron representing.

In some embodiments, getting (S201), of each product in the group of products, quality evaluation results comprises: choosing (S2011) images of products with high quality from images of the group of products; training (S2012), with the chosen images, a model for object recognition; recognizing (S2013), from each image of the group of products, product based on the trained model for object recognition; and taking (S2014), the confidence value of recognition, as quality evaluation result of the product recognized by the image.

As another example, some embodiments include an apparatus (300) for product quality inspection on a group of products, comprising: a data getting module (301), configured to get, of each product in the group of products: an image, a value for each known fabrication parameter affecting quality of the group of products, and a quality evaluation result; a training module (302), configured to train a neural network, wherein the layer M of the neural network comprises at least one first neuron and at least one second neuron, and each first neuron represents a known fabrication parameter affecting quality of the group of products and each second neuron represents an unknown fabrication parameter affecting quality of the group of products, and the images of the group of products are input to the neural network, the quality evaluation results are output of the neural network, and the value of each first neuron is set to the value for the known fabrication parameter the first neuron representing.

In some embodiments, the apparatus further comprises: a calculating module (303), configured to calculate respectively for each second neuron, based on the trained neural network with the added at least one neuron, influence on quality change due to change of value for the second neuron; and a comparing module (304), configured to compare the calculated influences, to determine the number of unknown fabrication parameters affecting quality of the group of products.

In some embodiments, the training module (302) is further configured to repeat following steps until predefined condition meets, when training a neural network comprises: adding a second neuron to the layer M of the neural network; training the neural network, wherein value of each neuron in the layer M except the new added second neuron is set to the value for the fabrication parameter the neuron representing; and calculating, based on the trained neural network, value for the new added second neuron, as the value of the unknown fabrication parameter the new added second neuron representing.

In some embodiments, when getting, of each product in the group of products, quality evaluation results, the data getting module (301) is further configured to: choose images of products with high quality from images of the group of products; train with the chosen images a model for object recognition; recognize from each image of the group of products, product based on the trained model for object recognition; and take the confidence value of recognition as quality evaluation result of the product recognized by the image.

As another example, some embodiments include an apparatus (300) for product quality inspection on a group of products, comprising: at least one processor (306); and at least one memory (307), coupled to the at least one processor (306), configured to execute one or more methods incorporating teachings of the present disclosure.

As another example, some embodiments include a non-transitory computer-readable media for product quality inspection, encoded with computer-executable instructions, wherein the computer-executable instructions when executed cause at least one processor to execute one or more methods incorporating teachings of the present disclosure.

BRIEF DESCRIPTION OF THE DRAWINGS

The above mentioned attributes and other features and advantages of the present technique and the manner of attaining them will become more apparent and the present technique itself will be better understood by reference to the following description of embodiments of the present technique taken in conjunction with the accompanying drawings, wherein.

Figure 1:
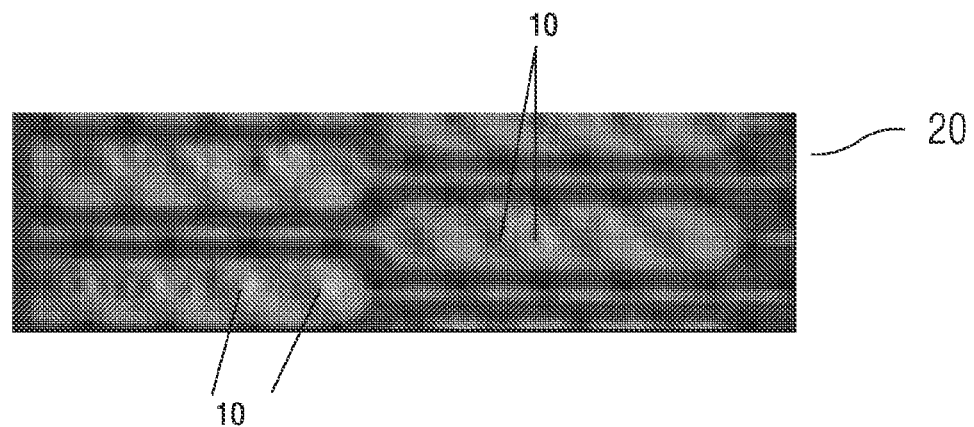
FIG. 1 shows a picture of an ACF (anisotropic conductive film) containing particle traces incorporating teachings of the present disclosure.

REFERENCE NUMBERS 10, particle trace on an ACF
20, an ACF
200, a method for product quality inspection according to an exemplary embodiment of the present disclosure
S201-S204, S2011-S2014, S2021-S2023, steps of method 200
30, images of a group of products
40, a neural network
401, layer M of the neural network 40
401a, a neuron presenting a known fabrication parameter affecting quality of the group of products
401b, a neuron presenting an unknown fabrication parameter affecting quality of the group of products
50, quality evaluation results of the group of products
300, an apparatus for product quality inspection according to exemplary embodiments of the present disclosure
301, a data getting module
302, a training module
303, a calculating module
304, a comparing module
305, at least one processor
306, at least one memory
307, I/O interface

DETAILED DESCRIPTION

To improve product quality, first, fabrication parameters affecting product quality are found. Usually, manufacturers might figure out from domain knowledge such fabrication parameters. However, domain knowledge sometimes is insufficient, for there might be other possible fabrication parameters which also affect product quality. With solutions of this invention, whether there are unknown fabrication parameters affecting product quality can be determined.

In some embodiments, a method for product quality inspection on a group of products includes:
getting of each product in the group of products: image, value for each known fabrication parameter affecting quality of the group of products, and quality evaluation result; and
training a neural network, wherein the layer M of the neural network comprises at least one first neuron and at least one second neuron, and each first neuron represents a known fabrication parameter affecting quality of the group of products and each second neuron represents an unknown fabrication parameter affecting quality of the group of products, and the images of the group of products are input to the neural network, the quality evaluation results are output of the neural network, and the value of each first neuron is set to the value for the known fabrication parameter the first neuron representing.

In some embodiments, an apparatus for product quality inspection on a group of products includes:
a data getting module, configured to get of each product in the group of products: image, value for each known fabrication parameter affecting quality of the group of products, and quality evaluation result; and
a training module, configured to train a neural network, wherein the layer M of the neural network comprises at least one first neuron and at least one second neuron, and each first neuron represents a known fabrication parameter affecting quality of the group of products and each second neuron represents an unknown fabrication parameter affecting quality of the group of products, and the images of the group of products are input to the neural network, the quality evaluation results are output of the neural network, and the value of each first neuron is set to the value for the known fabrication parameter the first neuron representing.

In some embodiments, an apparatus for product quality inspection includes:
at least one memory, configured to store instructions; and
at least one processor, coupled to the at least one memory, and upon execution of the executable instructions, configured to execute method according to the first aspect of the present disclosure.

In some embodiments, a computer-readable medium stores executable instructions, which upon execution by a processor, enables the processor to execute one or more of the methods incorporating teachings of the present disclosure.

Taking images of products which can reflect quality as input of a neural network, and quality evaluation results as output of the neural network, to find relationship between product image and quality. And letting at least one first neuron and at least one second neuron in layer M of the neural network represent fabrication parameter affecting product quality. With training of the neural network, to let it be in a stable status, fabrication parameters affecting product quality can be got. The solution provided introduces unknown fabrication parameters as neurons in the same layer with known fabrication parameters, with training of the neural network, unknown fabrication parameter's precise influence on product quality can be easily got in comparison with the known parameters.

In some embodiments, influence on quality change due to change of value for the second neuron can be calculated respectively for each second neuron, based on the trained neural network, and by comparing the calculated influences, the number of unknown fabrication parameters affecting quality of the group of products can be determined. Based on the trained model, influence on quality by added unknown fabrication parameters can be got.

In some embodiments, when training the neural network, following steps can be repeated until predefined condition meets:
 adding a second neuron to the layer M of the neural network;
 training the neural network, wherein value of each neuron in the layer M except the new added second neuron is set to the value for the fabrication parameter the neuron representing; and
 calculating, based on the trained neural network, value for the new added second neuron, as the value of the unknown fabrication parameter the new added second neuron representing.

Considering that some fabrication parameters might be related to each other, each time only one second neuron is added and the neural network is trained with the only one new neuron, to get pure influence of each unknown fabrication parameter on product quality.

In some embodiments, quality evaluation results can be got by following steps:
 choosing images of products with high quality from images of the group of products;
 training, with the chosen images, a model for object recognition;
 recognizing, from each image of the group of products, product based on the trained model for object recognition; and
 taking, the confidence value of recognition, as quality evaluation result of the product recognized by the image.

With the solutions provided, product quality can be precisely evaluated. The solution provided an easily implemented way to evaluate any kind of product, by comparing image of a product with images of high quality ones. Hereinafter, above-mentioned and other features of the present teachings are described in detail. Various embodiments are described with reference to the drawing, where like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the scope of the disclosure. It may be evident that such embodiments may be practiced without these specific details.

When introducing elements of various embodiments of the present disclosure, the articles "a", "an", "the" and "said" are intended to mean that there are one or more of the elements. The terms "comprising", "including" and "having" are intended to be inclusive and mean that there may be additional elements other than the listed elements.

In some embodiments, unknown fabrication parameters affecting product quality can help the manufacturer to gain insights on how a product quality is related to the manufacturing art during the product preparation process. With control and/or manipulation of both known and unknown fabrication parameters during manufacturing, product quality can be improved and the fluctuations in the quality be reduced significantly, i.e.: product quality→known fabrication parameters+unknown fabrication parameters Solutions disclosed can be used for situations when images of products are available. In some embodiments, possible number of unknown fabrication parameters affecting quality of products can be found. With possible further processing, such fabrication parameters can be found and dealt with to improve product quality.

We will illustrate using the following use case: finding the number of unknown fabrication parameters affecting the electric conductance quality particle traces on ACFs. To be noted that, particle traces on ACFs are just examples of products of the present disclosure, solutions can be used for other kinds of products for quality improvement considering fabrication parameters. And fabrication parameters can include all kinds of parameter related to manufacturing the products, such as temperature, moisture, etc.

Now the present technique will be described hereinafter in details by referring to FIG. 1 to FIG. 10. FIG. 1 shows an ACF 20, a flexible film which can be utilized in display manufacturing industry, during processes in display manufacturing, for instance, adhering chip on glass, pasting glass on displays, and installing IC on board, relying on ACF as mediator to bond components to each other, including IC driver module, panel, display, etc., and allowing them to be electrically interconnected. Particle traces 10 on an ACF 20 are examples of products in the present disclosure.

Figure 2:
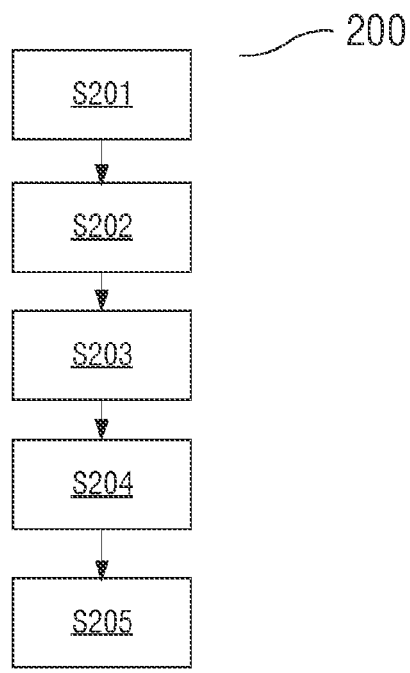
FIG. 2 depicts a flow chart for product quality inspection incorporating teachings of the present disclosure.

FIG. 2 depicts a flow chart for product quality inspection according to an exemplary embodiment of the present disclosure. The method 200 can include following steps:
 S201: getting, of each product in the group of products:
  image,
  value for each known fabrication parameter affecting quality of the group of products, and
  quality evaluation result;
Taking particle traces as example of group of products, following items of information can be got in the step S201:

| particle trace | value for known fabrication parameter 1(temperature) | value for known fabrication parameter 2(pressure) | image of a particle trace | quality evaluation result |
|---|---|---|---|---|
| 1 | 200.1° C. | 0.20 MPA | image 1 | quality 1 |
| 2 | 201.2° C. | 0.21 MPA | image 2 | quality 2 |
| 3 | 200.3° C. | 0.22 MPA | image 3 | quality 3 |
| ... | ... | ... | ... | ... |

Optionally, quality of a product can be evaluated by similarity of its image with other image (s) containing high quality same kind of products.

Figure 4:
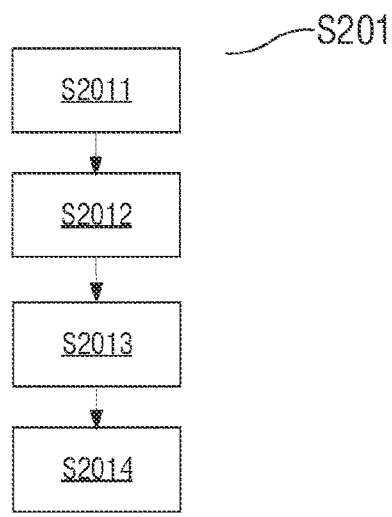
FIG. 4 depicts a flow chart for getting quality evaluation results incorporating teachings of the present disclosure.

Referring to FIG. 4, first, in sub step S2011, images of products with high quality can be chosen from images of the group of products. Whether a product with high quality can be judged by an engineer or a domain expert. Then in sub step S2012, a model for object recognition can be trained with the chosen imaged got in the sub step S2011. Next, from each image of the group of products, product can be recognized based on the trained model for object recognition. So, in sub step S2014, we can take the confidence value of recognition as quality evaluation result of the product recognized by the image. Here, we take confidence value of recognition as quality evaluation result based on the principle the higher quality of a product, the higher similarity with high quality products. Product quality is usually difficult to measure, and subjectively classified by the domain experts as "Good" or "No Good". Here, we use the images of product as inputs to model for object recognition and assign a numerical value to quality. With such numerical values, we can then proceed with finding the unknown fabrication parameters affecting product quality.

Figure 3:
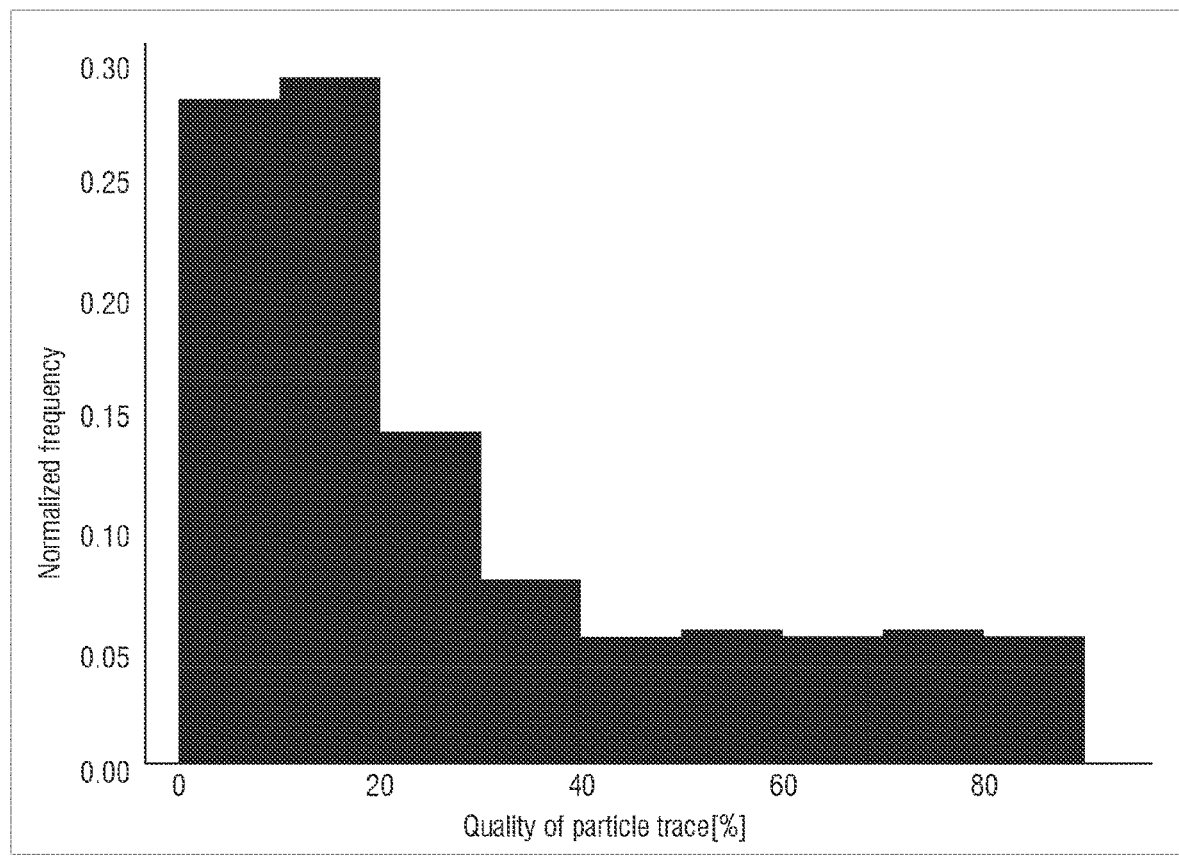
FIG. 3 depicts quality of particle trace influenced by fabrication parameters incorporating teachings of the present disclosure.

FIG. 3 shows a distribution of the particle trace's quality under some set of manufacturing parameters, including pressure and temperature. Value on the y-axis indicates normalized frequency based on temperature and pressure during manufacturing, and a low value on the x-axis indicates a low particle trace quality.

Figure 5A:
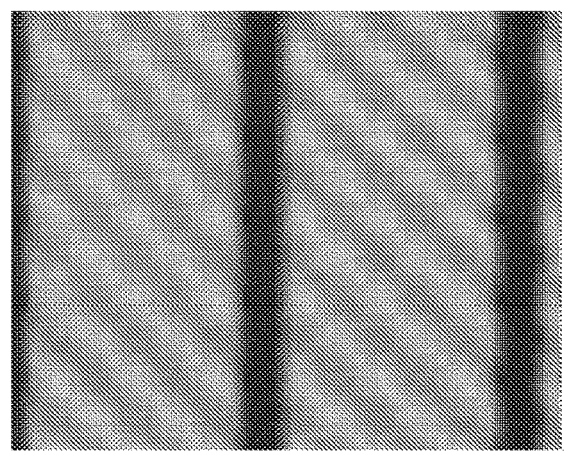
FIG. 5A shows a picture of an ACF containing particle traces incorporating teachings of the present disclosure.
Figure 5B:
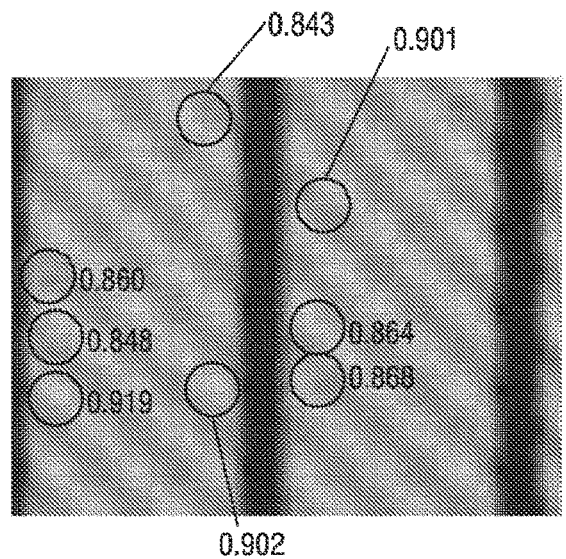
FIG. 5B shows confidence value of recognition for each particle trace incorporating teachings of the present disclosure.
Figure 6:
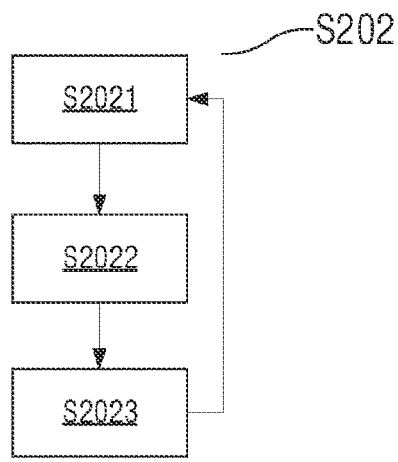
FIG. 6 depicts a flow chart for training a neural network incorporating teachings of the present disclosure.

In general, an object recognition-type model, such as a neural network will be trained in sub step S2012 to recognize high quality particle trace images. After training, the model takes in images shown in FIG. 5A (trace particles are in one image, which can be seen as separate images for each trace particle). Then, in sub step S2013, the model will search in these images for objects identifiable as particle traces. Once found, in sub step S2014, the model will output a value indicating its confidence that the object is a particle trace. This confidence value can be taken as quality evaluation result of a particle trace, as shown in FIG. 5B.

Figure 7:
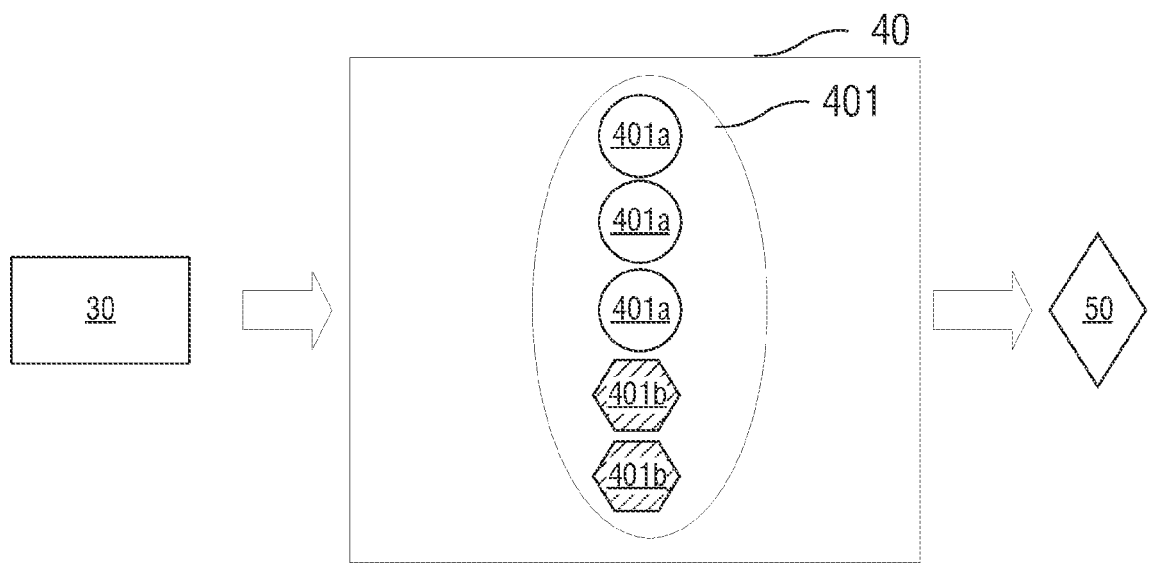
FIG. 7 depicts a process of training a neural network incorporating teachings of the present disclosure.
Figure 8:
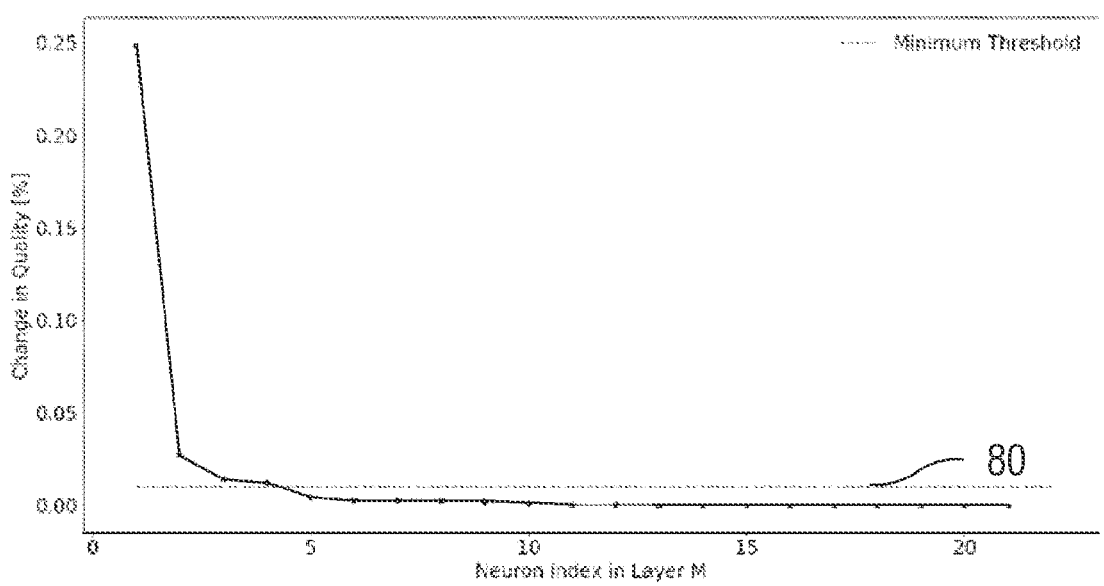
FIG. 8 depicts influences on quality versus each neuron in layer M of a neural network shown in FIG. 7.

S202: training a neural network. Referring to FIG. 7, the layer M 401 of the neural network 40 comprises:
- at least one first neuron 401a, representing a known fabrication parameter affecting quality of the group of products, and
- at least one second neuron 401b, representing an unknown fabrication parameter affecting quality of the group of products.

The images 30 of the group of products are input to the neural network 40, the quality evaluation results 50 are output of the neural network 40, and the value of each first neuron 401a is set to the value for the known fabrication parameter the first neuron 401a representing.

Following sub steps can be repeated for pre-determined times or until pre-defined condition meets, and for each repeat, the neural network 40 will be trained until convergence:

S2021: adding a second neuron 401b to the layer M 401 of the neural network 40.

S2022: training the neural network 40, wherein value of each neuron in the layer M except the new added second neuron 401b is set to the value for the fabrication parameter the neuron 401b representing.

S2023: calculating based on the trained neural network value for the new added second neuron 401b, as the value of the unknown fabrication parameter the new added second neuron 401b representing.

For example, there are 2 known fabrication parameters, so there are 2 first neurons in layer M 401. Initially, layer M 401 only contains 2 first neurons 401a, then 1 second neuron 401b is added, so total number of neurons in the layer M 401 is:

$$\text{Total number of neurons} = NF + NA + NE = 2+0+1 = 3 \text{ neurons}$$

Wherein, NF denotes number of known fabrication parameters, that is the number of first neurons, NA denotes number of unknown fabrication parameters except the new added second neuron, NE denotes number of the new added second neuron. In order to minimize influences of one fabrication parameter on another, e.g., for each repeat only 1 new second neuron is added.

With images 30 of group of products as inputs, setting value of the at least one first neuron as value for the corresponding known fabrication parameter, the neural network 40 is trained to output quality evaluation results of products. The loss function used during training for a single input of image 30 is:

$$Loss = (Qtruth - Qpredict)_2 + \Sigma(Ftruth - Fpredict)_2,$$

Wherein, the summation is taken to be the sum of the fabrication parameters F and the quality evaluation result Q, "truth" in the equation means the true known value and "predict" means its predicted value during the training of neural network 40, so $Ftruth$ denotes true values of fabrication parameters, $Fpredict$ denotes predicted values of fabrication parameters during training, $Qtruth$ denotes true values of quality evaluation result, $Qpredict$ denotes predicted quality evaluation result during training.

Next, we add another 1 new second neuron 401b. and the second neuron in $NA$ takes the computed values from $NE$ during the previous repeat as its truth values.

Now, total number of neurons in layer M is:

$$\text{Total number of neurons} = NF + NA + NE = 2+1+1 = 4 \text{ neurons}$$

with the loss function as:

$$Loss = \Sigma(Ftruth - Fpredict)_2 + (NA,truth - NA,predict)_2 + (Qtruth - Qpredict)_2,$$

wherein $NA$, truth are the true values taken from $NE$ as mentioned previously.

During each repeat, value for a new added second neuron 401b can be calculated, as the value of the unknown fabrication parameter the new added second neuron 401b representing.

For example, 3 new second neurons 401b are added, which respectively represent an unknown fabrication parameter affecting quality of the group of products.

| particle trace | value for known fabrication parameter 1(temperature) | value for known fabrication parameter 2(pressure) | value for unknow fabrication parameter 1 | value for unknow fabrication parameter 2 | image of a particle trace | quality evaluation result |
|---|---|---|---|---|---|---|
| 1 | 200.1° C. | 0.20 MPA | value 1.1 | value 2.1 | image 1 | quality 1 |
| 2 | 201.2° C. | 0.21 MPA | value 1.2 | value 2.2 | image 2 | quality 2 |
| 3 | 200.3° C. | 0.22 MPA | value 1.3 | value 2.3 | image 3 | quality 3 |

After step S202, a neural network 40 with the at least second neurons 401b in layer M 401 can be trained, based on which following computation on importance of fabrication parameters can be executed.

In step S203, we can calculate respectively for each second neuron 401b, based on the trained neural network 40, influence on quality change due to change of value for the second neuron 401b. and in step S204, the calculated influences can be compared to determine the number of unknown fabrication parameters affecting quality of the group of products.

For each second neuron 401b in the layer M 401, we change its value by a certain percentage, and compute the change in the particle trace quality $\Delta Q$. By graphing the result (referring to FIG. 8) of the change $\Delta Q$ versus each second neuron 401b, number of possible influential but unknown fabrication parameters can be determined by setting a minimum threshold 80. Note that, for the result in FIG. 8, we repeat 9 times. With the pre-defined minimum threshold 80, the algorithm finds that there are 4 neurons above the threshold (the left 4), hence 2 influential but unknown fabrication parameters could still affect the particle trace's quality (since we started with 2 known fabrication parameters).

Figure 9:
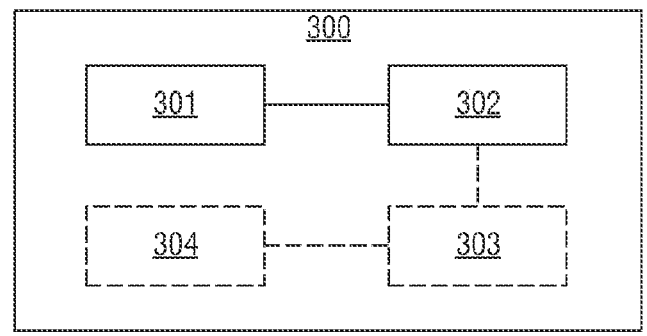
FIG. 9 and FIG. 10 depict block diagrams displaying exemplary embodiments of a product quality inspection apparatus incorporating teachings of the present disclosure.
Figure 10:
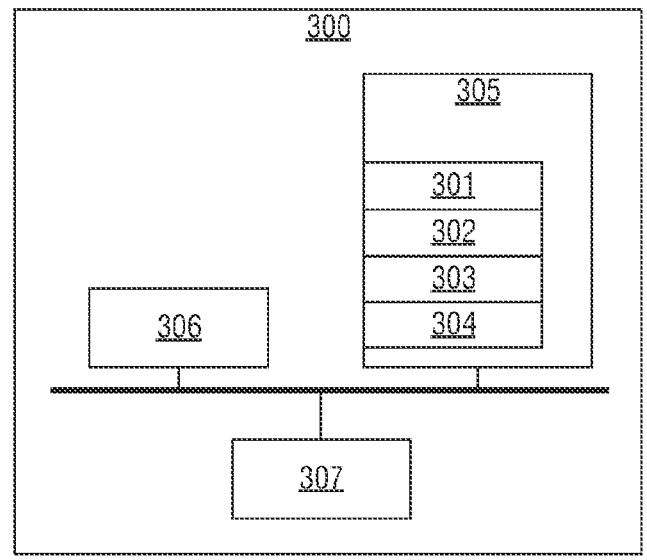

FIG. 9 and FIG. 10 depict block diagrams displaying exemplary embodiments of a product quality inspection apparatus of the present disclosure. Referring to FIG. 9 the product quality inspection apparatus 300 can include:
  a data getting module 301, configured to get, of each product in the group of products:
    image,
    value for each known fabrication parameter affecting quality of the group of products, and
    quality evaluation result;
  a training module 302, configured to train a neural network, wherein
    the layer M of the neural network comprises at least one first neuron and at least one second neuron, and each first neuron represents a known fabrication parameter affecting quality of the group of products and each second neuron represents an unknown fabrication parameter affecting quality of the group of products, and
    the images of the group of products are input to the neural network, the quality evaluation results are output of the neural network, and the value of each first neuron is set to the value for the known fabrication parameter the first neuron representing.

In some embodiments, the apparatus 300 can further include:
  a calculating module 303, configured to calculate respectively for each second neuron, based on the trained neural network with the added at least one neuron, influence on quality change due to change of value for the second neuron; and
  a comparing module 304, configured to compare the calculated influences, to determine the number of unknown fabrication parameters affecting quality of the group of products.

In some embodiments, the training module 302 is further configured to repeat following steps until predefined condition meets, when training a neural network comprises:
  adding a second neuron to the layer M of the neural network;
  training the neural network, wherein value of each neuron in the layer M except the new added second neuron is set to the value for the fabrication parameter the neuron representing; and
  calculating, based on the trained neural network, value for the new added second neuron, as the value of the unknown fabrication parameter the new added second neuron representing.

In some embodiments, when getting, of each product in the group of products, quality evaluation results, the data getting module 301 is further configured to:
  choose images of products with high quality from images of the group of products;
  train with the chosen images a model for object recognition;
  recognize from each image of the group of products, product based on the trained model for object recognition; and
  take the confidence value of recognition as quality evaluation result of the product recognized by the image.

FIG. 10 depicts another block diagram displaying the product quality inspection apparatus 300. Referring to FIG. 10, the product quality inspection apparatus 300 can include:
  at least one memory 305, configured to store instructions; and
  at least one processor 306, coupled to the at least one memory 305, and upon execution of the executable instructions, configured to execute the steps of method 200.

The above-mentioned modules 301304 can be software modules including instructions which are stored in the at least one memory 305, when executed by the at least one processor 306, execute the method 200.

In some embodiments, the product quality inspection apparatus 300 may also include a I/O interface 307, configured to receive inputs into the apparatus 300 and send outputs from the apparatus 300. The at least one processor 306, the at least one memory 305 and the I/O interface can be connected via a bus, or connected directly to each other.

A computer-readable medium may store executable instructions, which upon execution by a computer, enables the computer to execute one or more of the methods presented in this disclosure.

While the present teachings have been described in detail with reference to certain embodiments, it should be appreciated that the scope of the disclosure is not limited to those precise embodiments. Rather, in view of the present disclosure which describes exemplary modes, many modifications and variations would present themselves, to those skilled in the art without departing from the scope and spirit of this disclosure. The scope is, therefore, indicated by the following claims rather than by the foregoing description. All changes, modifications, and variations coming within the meaning and range of equivalency of the claims are to be considered within their scope.

What is claimed is:

1. A method for product quality inspection on a group of products, the method comprising:
  getting for each product in the group of products:
    image,
    value for each known fabrication parameter affecting quality of the group of products, and
    quality evaluation result;
  training a neural network; wherein
  a layer of the neural network comprises at least one first neuron and at least one second neuron;
  each first neuron represents a known fabrication parameter affecting quality of the group of products and each second neuron represents an unknown fabrication parameter affecting quality of the group of products; and
  the images of the group of products are input to the neural network, the quality evaluation results are output of the neural network, and the value of each first neuron is set to the value for the known fabrication parameter the first neuron representing.

2. The method according to the claim 1, further comprising:

calculating for the second neuron, based on the trained neural network, influence on quality change due to change of value for the second neuron; and comparing the calculated influences to determine a number of unknown fabrication parameters affecting quality of the group of products.

3. The method according to claim 1, wherein training a neural network comprises repeating:

adding an additional second neuron to the layer of the neural network;

training the neural network, wherein a value of each neuron in the layer except the additional second neuron is set to the value for the fabrication parameter representing the neuron;

calculating, based on the trained neural network, value for the new added second neuron, as the value of the unknown fabrication parameter the new added second neuron represents.

4. The method according to claim 1, wherein quality evaluation of each product in the group of products comprises:

choosing images of products with high quality from images of the group of products;

training, with the chosen images, a model for object recognition;

recognizing, from each image of the group of products, product based on the trained model for object recognition; and taking the confidence value of recognition as the quality evaluation result of the product recognized by the image.

5. An apparatus for product quality inspection on a group of products, the apparatus comprising:

a data getting module configured to get, for each product in the group of products:

image, value for each known fabrication parameter affecting quality of the group of products, and quality evaluation result;

a training module configured to train a neural network;

wherein a layer of the neural network comprises at least one first neuron and at least one second neuron;

each first neuron represents a known fabrication parameter affecting quality of the group of products and each second neuron represents an unknown fabrication parameter affecting quality of the group of products; and the images of the group of products are input to the neural network, the quality evaluation results are output of the neural network, and the value of each first neuron is set to the value for the known fabrication parameter the first neuron representing.

6. The apparatus according to the claim 5, further comprising:

a calculating module configured to calculate for each second neuron, based on the trained neural network with the added at least one neuron, influence on quality change due to change of value for the respective second neuron;

a comparing module configured to compare the calculated influences to determine a number of unknown fabrication parameters affecting quality of the group of products.

7. The apparatus according to claim 5, wherein the training module is further configured to repeat until meeting a predefined condition, when training a neural network comprises:

adding an additional second neuron to the layer of the neural network;

training the neural network, wherein value of each neuron in the layer except the new added second neuron is set to the value for the fabrication parameter the neuron representing; and calculating, based on the trained neural network, value for the additional second neuron, as the value of the unknown fabrication parameter the additional second neuron representing.

8. The apparatus according to claim 5, wherein when getting quality evaluation results, the data getting module is further configured to:

choose images of products with high quality from images of the group of products;

train with the chosen images a model for object recognition;

recognize from each image of the group of products, product based on the trained model for object recognition; and take the confidence value of recognition as quality evaluation result of the product recognized by the image.

9. An apparatus for product quality inspection on a group of products, the apparatus comprising:

a processor;

a memory coupled to the processor;

wherein the memory stores instructions causing the processor to:

get for each product in the group of products: image, value for each know fabrication parameter affecting quality of the group of products, and quality evaluation result;

train a neural network;

wherein a layer of the neural network comprises at least one first neuron and at least one second neuron;

each first neuron represents a known fabrication parameter affecting quality of the group of products and each second neuron represents an unknown fabrication parameter affecting quality of the group of products; and the images of the group of products are input to the neural network, the quality evaluation results are output of the neural network, and the value of each first neuron is set to the value for the known fabrication parameter the first neuron representing.

* * * * *